United States Patent
Rusko et al.

(10) Patent No.: US 8,387,522 B2
(45) Date of Patent: Mar. 5, 2013

(54) APPARATUS AND METHOD FOR TRIMMING THE SURFACE OF MEAT AS WELL AS APPARATUS FOR PROCESSING MEAT HAVING AN APPARATUS FOR SURFACE TRIMMING

(75) Inventors: Torsten Rusko, Herrnburg (DE); Ralf Neumann, Klempau (DE)

(73) Assignee: Nordischer Maschinenbau Rud. Baader GmbH & Co. KG., Lubeck (DE)

( * ) Notice: Subject to any disclaimer, the term of this patent is extended or adjusted under 35 U.S.C. 154(b) by 535 days.

(21) Appl. No.: 12/067,223

(22) PCT Filed: Aug. 5, 2006

(86) PCT No.: PCT/EP2006/008020
§ 371 (c)(1),
(2), (4) Date: Mar. 18, 2008

(87) PCT Pub. No.: WO2007/036261
PCT Pub. Date: Apr. 5, 2007

(65) Prior Publication Data
US 2008/0245243 A1    Oct. 9, 2008

(30) Foreign Application Priority Data
Sep. 28, 2005    (DE) .......................... 10 2005 047 752

(51) Int. Cl.
*A23N 4/04*    (2006.01)
*A23N 7/08*    (2006.01)

(52) U.S. Cl. ................ 99/540; 99/485; 99/537; 99/538; 99/539; 99/584; 452/149; 222/240

(58) Field of Classification Search .................... 99/485, 99/537–540; 452/149; 222/240
See application file for complete search history.

(56) References Cited

U.S. PATENT DOCUMENTS

| | | | | |
|---|---|---|---|---|
| 2,214,285 A | * | 9/1940 | Schmidt | 460/56 |
| 3,800,363 A | * | 4/1974 | Lapeyre | 452/158 |
| 4,174,789 A | * | 11/1979 | West | 222/240 |
| 4,378,613 A | * | 4/1983 | Crouch | 452/127 |
| 4,748,724 A | | 6/1988 | Lapeyre et al. | |
| 4,962,568 A | * | 10/1990 | Rudy et al. | 452/157 |
| 5,181,879 A | * | 1/1993 | Lapeyre et al. | 452/160 |
| 5,241,365 A | * | 8/1993 | Haagensen | 356/604 |

(Continued)

FOREIGN PATENT DOCUMENTS

| | | |
|---|---|---|
| DE | 257009 A1 | 6/1988 |
| DE | 19834524 A1 | 2/2000 |

(Continued)

*Primary Examiner* — Henry Yuen
*Assistant Examiner* — Brett Spurlock
(74) *Attorney, Agent, or Firm* — Mattingly & Malur, P.C.

(57) ABSTRACT

The invention relates to a device for trimming the surface of meat, in particular fish fillets, comprising a transporting element by means of which the products which are to be processed are conveyed continuously in the transporting direction T into the region of a knife head, also comprising an element for detecting the position of the products, as well as a knife head for trimming the products and a means of controlling the movement of the knife head in dependence on the information and data determined by the position-detecting element, the device being distinguished in that the knife head is designed for automatically executing free trimming cuts along the surface contour of the products. The invention also relates to an apparatus for processing meat using a device mentioned above, and to a corresponding surface-trimming method.

19 Claims, 4 Drawing Sheets

U.S. PATENT DOCUMENTS

| | | | | |
|---|---|---|---|---|
| 5,293,803 A | * | 3/1994 | Foster | 83/865 |
| 5,352,153 A | * | 10/1994 | Burch et al. | 452/157 |
| 5,462,478 A | * | 10/1995 | Fredsby et al. | 452/135 |
| 5,492,502 A | * | 2/1996 | Hjorth | 452/170 |
| 5,569,068 A | * | 10/1996 | DeRoche et al. | 452/127 |
| 5,591,076 A | * | 1/1997 | Evers et al. | 452/157 |
| 6,579,164 B1 | * | 6/2003 | Groth | 452/125 |
| 6,649,412 B1 | * | 11/2003 | Borggaard et al. | 436/20 |
| 2003/0145699 A1 | * | 8/2003 | Kim et al. | 83/13 |
| 2004/0116062 A1 | * | 6/2004 | Bech | 452/161 |
| 2005/0014461 A1 | * | 1/2005 | Eilersten | 452/161 |
| 2005/0032471 A1 | | 2/2005 | Pfarr et al. | |

FOREIGN PATENT DOCUMENTS

| | | | |
|---|---|---|---|
| DK | 200400450 L | | 9/2005 |
| GB | 2364894 | | 2/2002 |
| GB | 2364894 A | * | 2/2002 |
| WO | WO 0062983 A1 | * | 10/2000 |
| WO | 01/67873 | | 9/2001 |
| WO | 03/037090 A1 | | 5/2003 |
| WO | 2004/106020 A1 | | 12/2004 |

* cited by examiner

APPARATUS AND METHOD FOR TRIMMING THE SURFACE OF MEAT AS WELL AS APPARATUS FOR PROCESSING MEAT HAVING AN APPARATUS FOR SURFACE TRIMMING

The invention relates to an apparatus for trimming the surface of meat, in particular fish fillets, comprising a transport element for the continuous conveying of products to be processed in the transport direction T into the region of a knife head, an element for recognising the position of the products, a knife head for trimming the products, and a regulating and/or controlling device for moving the knife head depending on the data and information determined by the element for position recognition.

The invention further relates to an apparatus for processing fish comprising a transport element, an element for position recognition, at least one dividing means, a regulating and/or controlling device functionally connected to the element for position recognition and to the or each dividing means as well as an apparatus for surface trimming which likewise is functionally connected to the regulating and/or controlling device.

The invention is also concerned with a method for surface trimming meat, in particular fish fillets, comprising the steps: recognition of the position of the products to be processed using an element for position recognition, determining geometric data and/or image data for each product, feeding the products into the region of a knife head by means of a transport element, trimming the products by cutting a strip of meat from the products by means of the knife head on the basis of the data determined previously and carrying the products away from the region of the knife head by means of the transport element.

In the meat and fish processing industry products are usually processed in automated fashion. With reference to fish processing this means that the fish fillets are subjected to surface trimming. By means of surface trimming undesired and/or value-reducing constituents are removed from the surface of the fish fillet. This involves, for example, the removal of white ventral skin, fin attachments, filleting defects or other faults. However, products have different sizes and/or contours and/or topographies. The products may also assume different positions and postures on the transport element. This means that each product has to be treated individually in order to reach a satisfactory result.

This objective has frequently been achieved hitherto by manual trimming. After automatic filleting in an appropriate apparatus one or more operators process the fish fillets using so-called manual trimming devices. These can be simple hand blades also optionally provided with an oscillating or rotating drive. This has the disadvantage, however, that due to manpower requirements surface trimming is very expensive and hence unattractive. Furthermore, the quality of trimming and hence the product yield is dependent on the qualifications and experience of the operator in question.

To avoid said disadvantages attempts have been made to automate surface trimming. WO 03/037090, for example, discloses an apparatus for the automatic trimming of fish fillets. The apparatus comprises a tool with an oscillating knife head. The knife head is controllable by a control system. A camera is provided for recognising the surface sections to be processed. By means of the control system the knife head is then moved by motor to the corresponding points. In order to bring the knife head into engagement with the product the known apparatus has a lifting plate by means of which the regions of the product to be processed are raised to a level plane in the direction of the knife head and trimmed. In this plane the oscillating knife then executes a horizontal cut. This apparatus together with the associated method, however, has the disadvantage that the product at least in part loses contact with the transport belt so that precisely during the cutting operation there is the risk of slipping. Furthermore, the lifting plate is of inflexible construction as a result of which there is a lack of adaptation to the different products. Particularly disadvantageous, however, is the fact that controlled surface removal is not possible since the topography of the surface to be processed is highly variable.

The latter problem still persists even when the previously described hand tools are retrofitted in apparatuses for filleting because there is a lack of controlled angular movement. In other words the knife cannot be adapted to the topography of the product. The blades also often need to be resharpened during use, resulting in idling times for the entire apparatus. Furthermore, the exposed serrations can easily be soiled and thus give rise to malfunctions or even failures. Another problem is the necessary lubrication of the drive which occurs in the immediate vicinity of the product and adversely affects the quality of the product.

Accordingly, it is an object of the present invention to provide a compact apparatus for product-specific and automatic surface trimming. Another object consists in proposing a corresponding method. A further object consists in providing an apparatus for processing meat having said properties of surface trimming.

This task is solved by an apparatus of the type identified at the outset in that the knife head is constructed for the automatic execution of free trimming cuts along the surface contour of the products. This ensures that the trimming cuts can be executed individually. Due to the free movement of the knife head in space products of different size, of different contour and having individual defects can be trimmed automatically since the knife head—as in the case of manual trimming—can reach any position of the product.

For this purpose the knife head is preferably constructed to be movable about and/or along at least three axes. This construction in particularly simple and compact manner allows the free mobility of the knife head.

In a preferred refinement the apparatus according to the invention the knife head is constructed to be movable about and/or along four axes. In this way other cutting parameters can be set which give rise to still better and more individual cutting results.

An advantageous embodiment of the invention is characterised in that the knife head comprises a circular blade. Trimming cuts of high quality are achieved with the circular blade in a compact structure.

Advantageously, there is a cutting counter-surface, wherein the cutting counter-surface is constructed as a detection element at least in a region located ahead of the circular blade in the transport direction T of the products to be processed. Apart from improved cutting guidance the cutting counter-surface is thereby also usable as a control element, since due to the construction according to the invention the product first strikes against the cutting counter-surface and by means of the latter the knife head is controllable and, if need be, is movable along the products for recognising the contour of the latter.

A preferred embodiment is characterised in that the cutting counter-surface is arranged inclined to the circular blade in such a way that the plane $E_1$ spanned by the circular blade and the plane $E_2$ spanned by the underside of the cutting counter-surface intersect at least at one point S. Thereby it is ensured that the parts to be separated from the product are also actually completely detached from the product since the products must inevitably pass through the point of intersection.

In an advantageous development of the invention the knife head is associated with a device for removing parts separated from the product. In this way the region of the knife head is always free of interfering parts which results in improved cutting quality and troublefree operation.

The task is also solved by a method having the steps identified at the outset in that the knife head for trimming the products is automatically moved freely in space. The advantages resulting from this have already been discussed above so that repetition is dispensed with at this point.

The task is further solved by an apparatus for processing meat having the characteristics identified above in that the apparatus for surface trimming is constructed according to one of claims 1 to 25. The advantages resulting from this were identified in connection with the apparatus for surface trimming so that these sections are referred to.

Other advantageous or preferred features and constructions as well method steps are evident from the subsidiary claims and the description. A particularly preferred embodiment and the method are explained in more detail with reference to the attached drawings. The drawings show:

Figure 1:
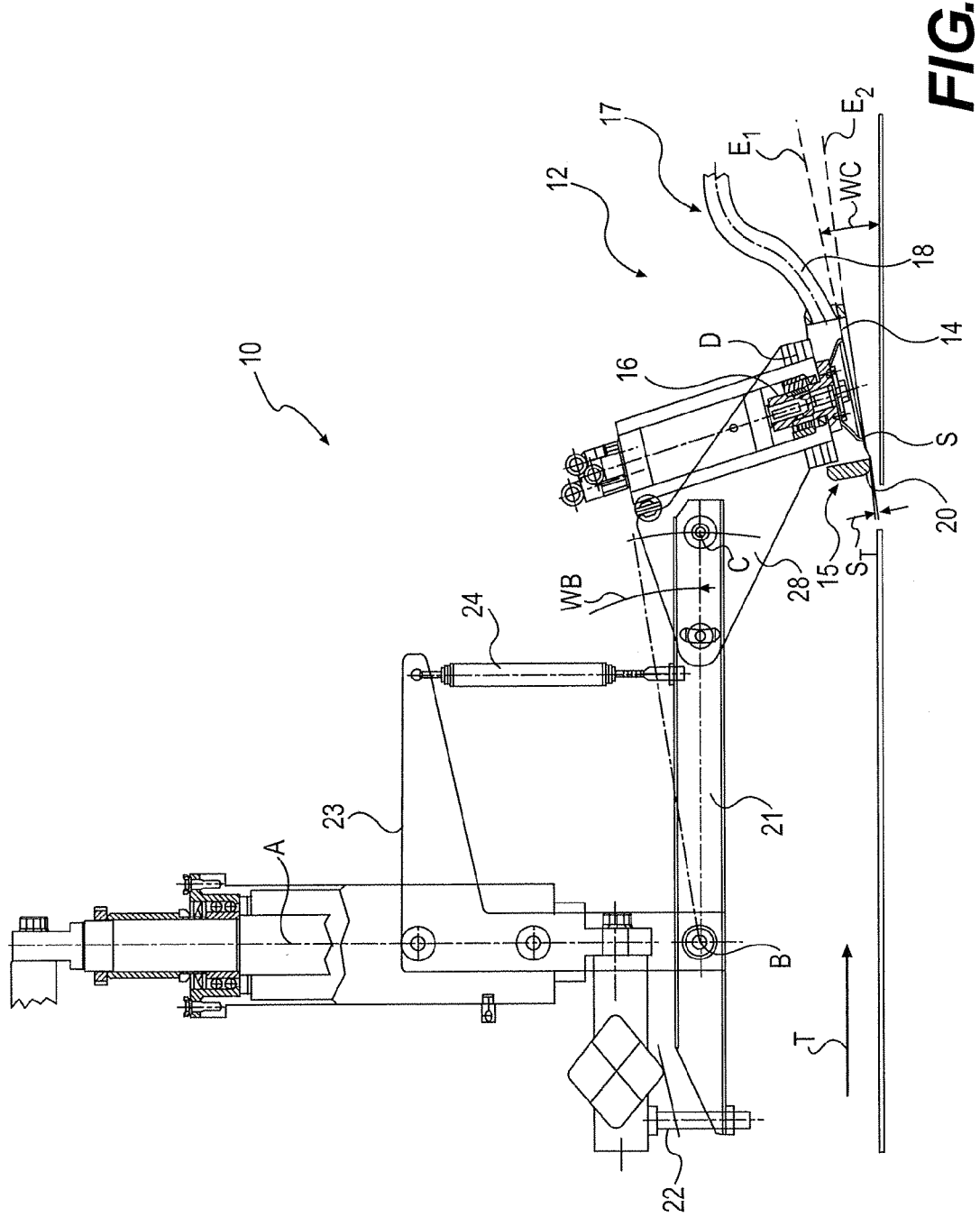
FIG. 1 is a schematic illustration of the apparatus for the surface trimming of meat in side elevation.
Figure 2:
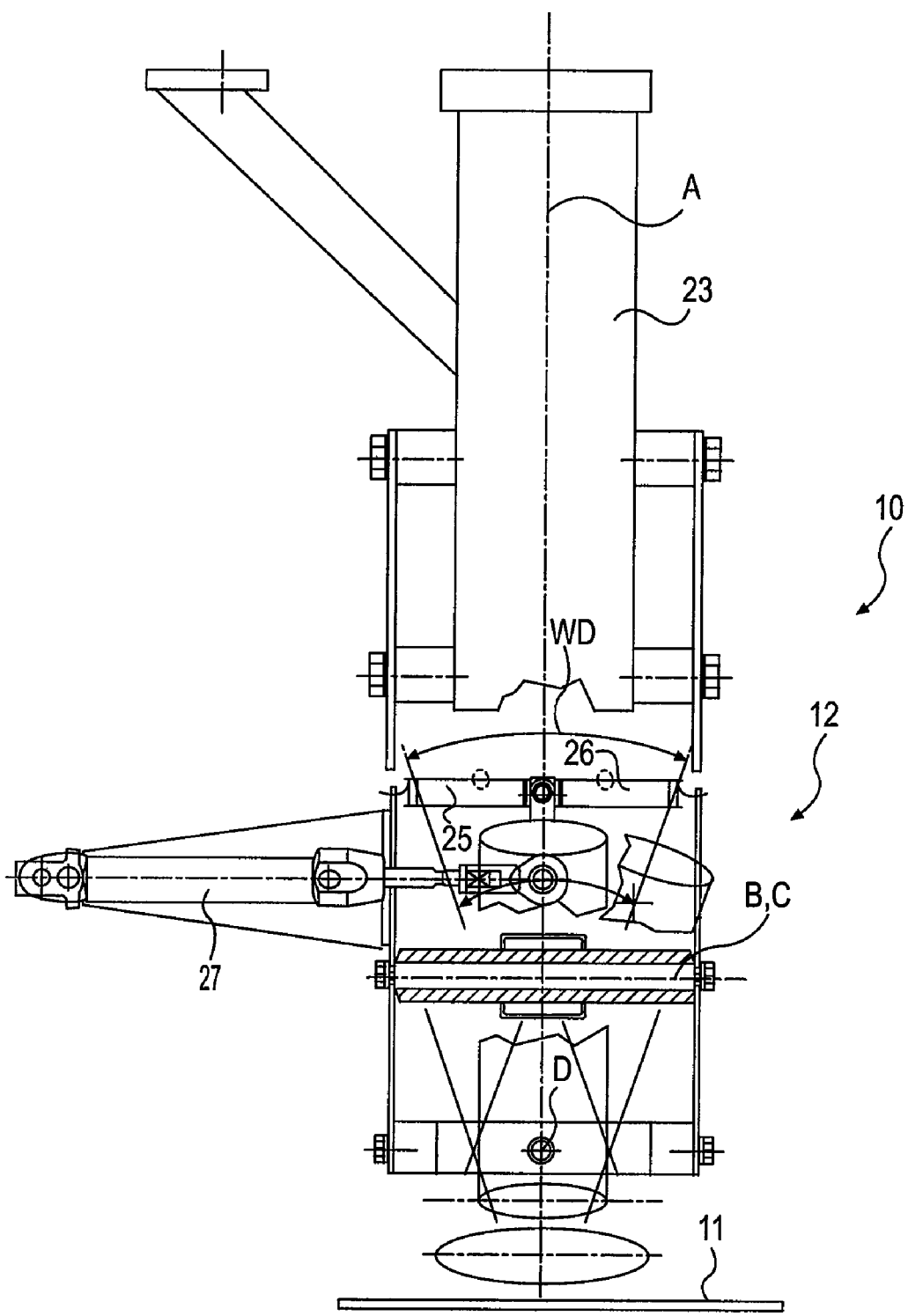
FIG. 2 is a view of the apparatus according to FIG. 1 counter to the transport direction T.
Figure 3:
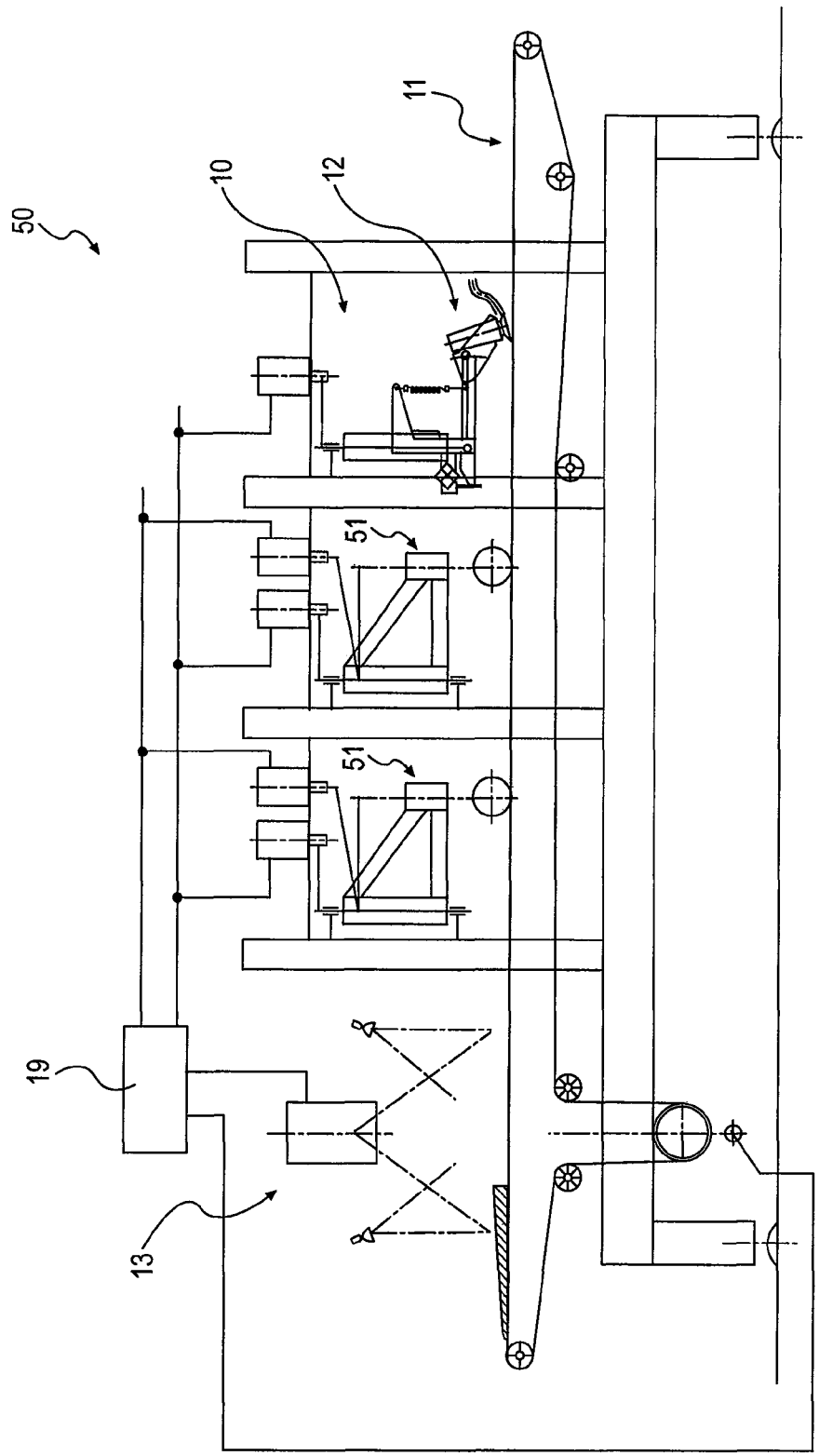
FIG. 3 is an apparatus for processing meat with an apparatus for surface trimming according to FIG. 1.
Figure 4:
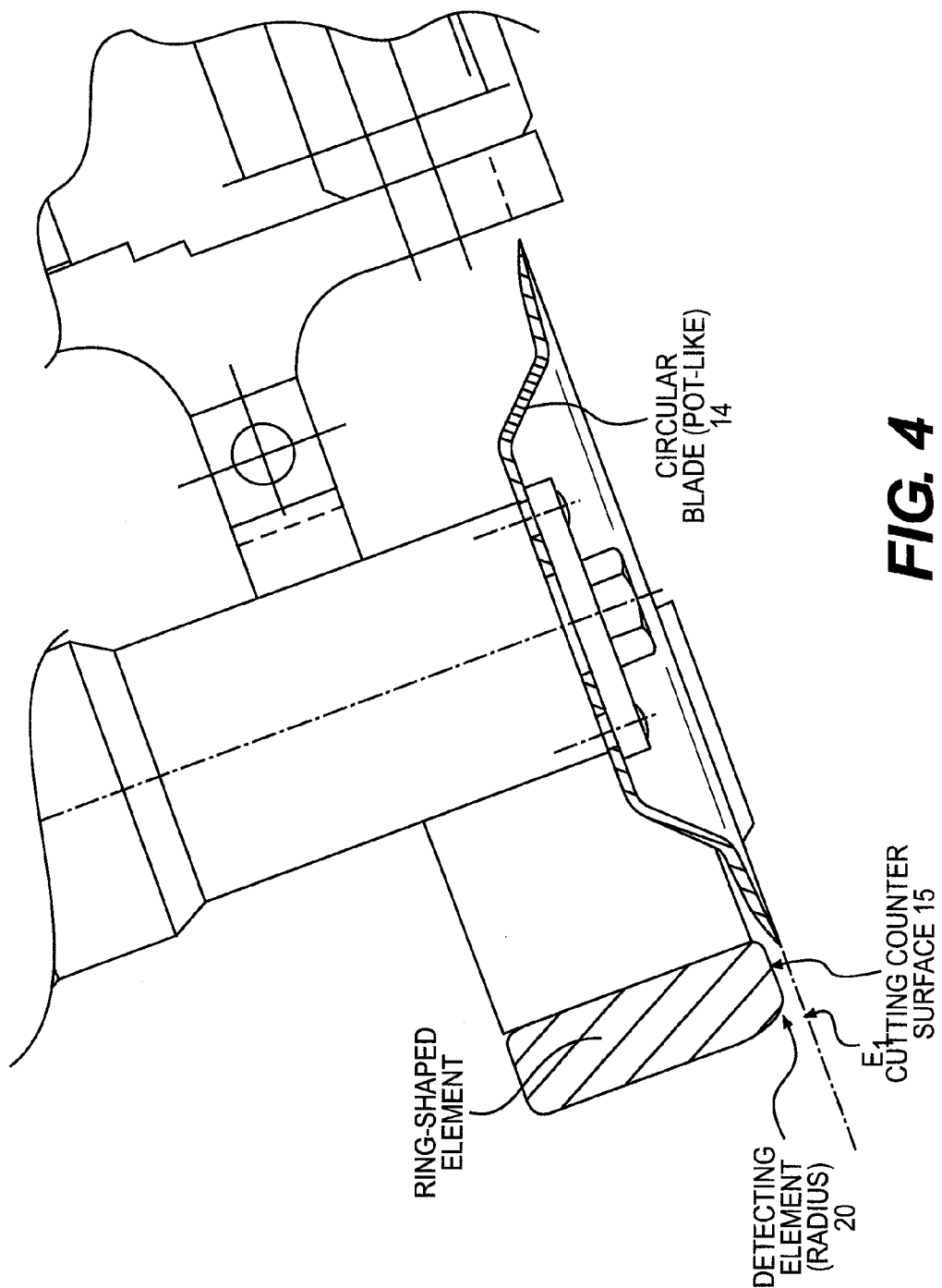
FIG. 4 is an enlarged view of a portion of FIG. 1 showing the circular blade, cutting counter surface and detecting element.

The apparatus illustrated in FIGS. 1 and 2 is a selected embodiment for surface trimming of fish fillets, wherein the apparatus can be constructed as an individual apparatus or as a component of an apparatus for processing fish as shown in FIG. 3.

An example of an apparatus 10 for surface trimming is presented in FIG. 1. The apparatus 10 comprises a transport element 11 which is preferably constructed as an endlessly circulating transport belt and is used for the continuous conveyance of the products to be processed into the region of a knife head 12. The transport element is of course also constructed and is suitable for conveying the product to be processed out of the region of the knife head 12. Optionally the transport element 11 can be associated with an apparatus (not shown explicitly) for producing a low-pressure. By means of the low-pressure the products can be fixed on the transport element 11 at least partially and at least temporarily, preferably during the actual trimming operation. Other standard possibilities for fixing products on the transport element 11 to prevent any relative movement between the product and the transport element 11, i.e. to preclude slippage of the product, are explicitly also possible.

The products are usually conveyed in the transport direction in accordance with the arrow T. Furthermore, the apparatus 10 comprises an element 13 illustrated in FIG. 3 for position recognition which is designed for recording data about the products conveyed on the transport element 11 beneath the element 13. The element 13 is preferably a camera. The element 13 is optionally designed for recording information which is processable to data of two types, preferably geometric data and/or image data. Finally, a control system 19 (illustrated only in FIG. 3) forms part of the apparatus 10. The knife head 12 is controllable by the control system 19 on the basis of the determined data and information.

The knife head 12 is used for trimming the surface of the products fed to the apparatus. Trimming designates the cutting of strips of the product located on the surface, which strips for reasons of quality and/or visual appearance are to be removed from the actual product. The knife head is constructed for the automatic execution of free trimming cuts along the surface contour of the products. To this end the knife head 12 comprises a circular blade 14. The circular blade 14 can be constructed in various customary styles. However, a pot-like construction is preferred. A cutting counter-surface 15 is associated with this circular blade, also referred to as a pot blade. The cutting counter-surface 15 is of annular construction, wherein other shapes of cutting counter-support 15 are also usable. In a region located in the transport direction T ahead of the circular blade 14 the cutting counter-surface 15 is additionally constructed as a detection element 20. In the shown embodiment the detection element 20 is an integrated component of the cutting counter-surface 15 and simultaneously serves to control a vertical movement of the knife head 12 and to "scan" the contour of the products to be processed as described below. The cutting counter-surface 15 and the circular blade 14 are preferably constructed at an inclination to one another. This means that the plane $E_1$ spanned by the circular blade 14 and the plane $E_2$ spanned by the underside of the cutting counter-support 15 intersect at least at one cutting point S. Furthermore, this inclination is adjustable from an inclination of zero to a maximum inclination, wherein the cutting thickness or cutting depth $S_T$ is increased with increasing inclination. As already mentioned, the cutting counter-surface 15 is shaped in such a way that it is suitable for recognising the contour of the products. This can be achieved, for example, by a stepped, corrugated or otherwise defined construction. Furthermore, directed counter to the transport direction T the cutting counter-surface 15 has a ramp-like or sloping or rounded form in such a way that the incoming products reliably run through under the cutting counter-surface 15 or the knife head 12. In other words, the shape ensures that the knife head 12 is raised by the incoming products.

Associated with the knife head 12 is a drive 16. The drive 16 serves to drive the circular blade 14 in rotating manner and can, for example, be constructed as a compressed air motor. Other common drive means such as electric or hydraulic drives may also be used, however. The residues, such as strips of meat, strips of skin, etc, accumulating as a result of trimming can be carried away from the trimming region by suitable means. For this purpose the knife head 12 and more precisely the cutting counter-support 15 is associated, for example, with a device 17 for removing the parts separated from the product. This device 17 may, for example, be a suction device. The key components of such a suction device include a hose 18, which preferably dips through the cutting counter-surface 15 directly into the operating region of the circular blade 14 or more precisely is connected to the operating chamber above the circular blade 14, and a corresponding pump by means of which the separated parts can be carried away through the hose 18 into a collecting container or the like.

For executing the individual trimming cuts the knife head 12 is constructed to move about and/or along at least three, but preferably about and/or along four, axes. In the embodiment shown the knife head 12 is in the first place arranged via a flange element 28 on a lever element 21 that is movable up and down pivotably about a horizontally running axis B, that is to say in the vertical direction perpendicular to the transport element 11 (angular movement WB). The flange element 28 itself is arranged movably or pivotably on the lever element 21. An optionally provided stop 22 serves the purpose that the lever element 21 cannot pivot downwards about the axis B beyond a horizontal position. The lever element 21 is arranged on a rocker 23 which for its part is rotatable about a vertical axis A. By this means a movement transverse to the transport direction T parallel over the transport element 11 is achievable. The lever element 21 is additionally connected to the rocker 23 via a compensating element 24. The compensating element 24 can be a pneumatic or hydraulic cylinder, a spring element or a counterweight. Other elements, which are equally as adjustable as those specified above and are adjustable in the force applied, may also be employed. The cutting pressure, when product consistencies differ for example, can be adapted by means of the compensating element 24.

Furthermore, the knife head 12 is constructed to be tiltable about an axis D transverse to the transport direction T. By this means the knife head 12 can execute an angular movement WD about the axis D, wherein the lateral cutting pressure is adjustable via the angular movement WD. For this purpose spring elements 25, 26 are provided which may also be replaced by elements having the same effect. Optionally, for executing the tilting movement the knife head 12 can be associated with a pneumatic cylinder 27 or the like, as a result of which controlled movement into the corresponding end positions in particular can be achieved. Another possibility for moving the knife head 12 exists about the axis C. About the horizontally extending axis C a pivot movement of the knife head 12 relative to the lever element 21 is ensured, as a result of which the setting angle WC of the circular blade 14 on the product and hence the cutting width is adjustable.

The knife head 12 is constructed to track individual product contours. This means that the products are each trimmable in optimum manner on their surface regardless of the individual geometry and/or contour as well as regardless of size. In doing so the knife head 12 can be controlled, optionally under product control, in particular with the aid of the detection element 20, and/or actively by suitable auxiliary means such as pressure cylinders, spring elements, compensating weights and also by its own weight. In particular the height movement about the axis B and the tilting movement D (angular movement WD) can at least in part or in sections be assisted by the product. In the version described the movements about the axes A and B are described as pivot movements on an arc-shaped track. Alternatively, these movements may also be implemented in the linear direction, for example by means of linear slides or the like.

The apparatus 10 can be constructed and used as an individual module. Alternatively, however, the apparatus 10 may also be an integral component of a superior apparatus 50 for processing meat for example. Such an apparatus 50 can be taken from FIG. 3, wherein in the transport direction T of the products to be processed the apparatus 50 comprises an element 13 for position recognition, at least one dividing means 51 and the apparatus 10. The products are transportable continuously or stepwise from station to station by means of the transport means 11. All components are connected to the common regulating and/or controlling apparatus 19 constructed both to regulate/control the or every dividing means 51 and to regulate/control the apparatus 10. The element 13 for position recognition serves for recording information and data usable for the trimming and/or dividing cuts and for surface trimming.

In the following especially the method for surface trimming fish fillets is explained in more detail with reference to FIGS. 1 to 3.

The fish fillets are introduced into the apparatus 10 in one or more tracks by means of the transport element 11. First of all the or each fish fillet runs along underneath the element 13 for position recognition. By means of the element 13 for position recognition information about the position of the or each fish fillet on the transport element 11 and the position of the regions in the fillet to be trimmed are recorded. The recording is preferably done optically using suitable camera elements or the like. The information and data determined (geometric data and/or image data) are evaluated and passed on to the following stations (dividing means 51 and apparatus 10). Alternatively or cumulatively, statistical values may also be called upon to control the subsequent stations.

After cutting and trimming by dividing means 51 the fillets are transported under the apparatus 10. When the fillet reaches the knife head 12 the latter is moved by the rocker 23 to the fillet in accordance with the parameters determined or calculated. By means of the cutting counter-surface 15 or the detection element 20 the knife head 12 is raised by the fillet. While the cutting counter-surface 15 slides along on the fillet following in doing so the contour of the fillet, a strip is cut from the surface of the fillet in accordance with the gap St (see FIG. 1) and the angle WC. Due to the controlled transverse movement of the circular blade 14 about the axis A the zone of action of the circular blade 14 on the fillet can be altered. Through the angular movement WD the knife head 12 adapts itself to the different surface contours/structures so that it can traverse or track them in optimum fashion. The strips and parts cut off are removed by suction through the hose 18 and carried out of the apparatus 10. During surface trimming the fillets are fixed on the transport element 11 by low-pressure. After surface trimming the fillets are transported away out of the apparatus 10 by the transport element 11.

The transverse movement about the axis A is controlled by the fillet recognition system. The fillet controls the height movement about the axis B via the cutting counter-surface 15 and/or the detection element 20. The cutting pressure is adapted to the consistency of the fillet by the setting of the compensating element 24. The setting angle WC of the knife head 12 controlling the cutting width of the circular blade 14 is set and fixed by the flange element 28. Setting can be done prior to the processing in question and on-line. The angular movement WD can be carried out both by the fillet and under active control. In doing so it may also be useful in some circumstances to control actively the lateral inclination WD of the knife head 12 in some areas of the fillet and in other areas to sense the movement of the fillet via the cutting counter-surface 15 or the detection element 20. Optionally, via the spring elements 25, 26 the lateral cutting pressure can be adjusted through the angular movement WD. In addition through the pneumatic cylinder 27 controlled movement of the knife head 12 into the end positions about the axis D can take place. Furthermore, the cutting depth or cutting thickness $S_T$ can also be set. For this purpose the inclination between the circular blade 14 and the cutting counter-surface 15 has to be altered. The greater the inclination the greater becomes the gap $S_T$ which determines the cutting thickness.

However, the method is of course applicable in corresponding manner to the surface trimming of other meat products.

The invention claimed is:

1. Apparatus for trimming the surface of meat, in particular fish fillets, comprising a knife head for trimming products to be processed, a transport element for the continuous conveying of products to be processed in a transport direction T into a region of the knife head, an element for recognizing a position of the products, and a control system for moving the knife head depending on data and information determined by the element for recognizing the position of the products, characterized in that the knife head comprises a rotating circular blade and a cutting counter-surface located above the cutting edge of the circular blade, the cutting counter-surface having a detection element associated therewith for recognizing a contour of the products, and wherein the knife head is constructed to be movable in at least three axes A, B and D for automatic execution of free trimming cuts following individual surface contours of the products whereby a surface of the product is trimmed, and wherein the knife head is arranged via a flange element on a lever element that is pivotably movable up and down about the axis B which is a horizontally extending axis, the lever element is arranged on a rocker which for its part is rotatable horizontally about the axis A which is a vertical axis, and the knife head is constructed to be tiltable from side to side about the axis D transverse to the transport direction T.

2. Apparatus according to claim 1, characterized in that the knife head is optionally product-controlled and/or actively controlled.

3. Apparatus according to claim 1, characterized in that the lever element is additionally connected via a compensating element to the rocker.

4. Apparatus according to claim 3, characterized in that the compensating element is optionally a hydraulic or pneumatic cylinder, a spring, or a counterweight.

5. Apparatus according to claim 1, characterized in that the knife head is pivotable relative to the lever element about a horizontally extending axis C.

6. Apparatus according to claim 1, characterized in that the pivot movement about the horizontally extending axis B and the tilting movement about the axis D are optionally executable under product control and/or under drive control.

7. Apparatus according to claim 1, characterized in that a cutting pressure is adjustable about the axis D by means of spring elements.

8. Apparatus according to claim 4, characterized in that for executing the tilting movement about the axis D, the knife head is associated with a pneumatic cylinder.

9. Apparatus according to claim 1, characterized in that the cutting counter-surface is of ring-shaped construction.

10. Apparatus according to claim 1, characterized in that the circular blade is of pot-like construction.

11. Apparatus according to claim 1, characterized in that the cutting counter-surface is arranged inclined with respect to the circular blade in such a way a plane $E_1$ spanned by the circular blade and a plane $E_2$ spanned by the underside of the cutting counter-surface intersect at least at one point.

12. Apparatus according to claim 11, characterized in that the inclination between the circular blade and the cutting counter-surface is adjustable.

13. Apparatus according to claim 8, characterized in that the knife head is associated with a drive for the circular blade.

14. Apparatus according to claim 1, characterized in that the transport element is associated with a device for producing a low-pressure in such a way that the products are fixed on the transport element at least during the cutting operation.

15. Apparatus according to claim 1, characterized in that the knife head is associated with a device for removing parts separated from the product.

16. Apparatus according to claim 15, characterized in that the knife head is associated with a suction device.

17. Apparatus for processing meat comprising a transport element, an element for position recognition, at least one dividing means, a regulating and/or controlling device functionally connected to the element for position recognition and to the dividing means, as well as an apparatus for surface trimming which is likewise actively connected to the regulating and/or controlling apparatus, characterized in that the apparatus is constructed for surface trimming according to claim 1.

18. Apparatus according to claim 17, characterized in that the element for position recognition in the apparatus for processing meat is identical to the element for position recognition in the apparatus for surface trimming.

19. Apparatus according to claim 17, characterized in that the regulating and/or controlling apparatus in the apparatus for processing meat is identical to the control system in the apparatus for surface trimming.

* * * * *